United States Patent [19]
Suzuki et al.

[11] Patent Number: 5,844,255
[45] Date of Patent: *Dec. 1, 1998

[54] STRUCTURE OF LIQUID CRYSTAL DISPLAY DEVICE FOR ANTIREFLECTION

[75] Inventors: Masahiko Suzuki, Mobara; Kikuo Ono, Ibaraki-ken; Junichi Ohwada, Mobara; Hikaru Itoh, Mobara; Tatsuo Kamei, Mobara; Kuniyuki Matsunaga, Mobara, all of Japan

[73] Assignee: Hitachi, Ltd., Tokyo, Japan

[*] Notice: The term of this patent shall not extend beyond the expiration date of Pat. No. 5,668,649.

[21] Appl. No.: 795,792

[22] Filed: Feb. 5, 1997

Related U.S. Application Data

[63] Continuation of Ser. No. 396,774, Mar. 1, 1995, Pat. No. 5,668,649, which is a continuation-in-part of Ser. No. 255,958, Jul. 6, 1994, Pat. No. 5,541,748.

[30] Foreign Application Priority Data

Mar. 7, 1994 [JP] Japan .................................. 6-035613

[51] Int. Cl.$^6$ ........................ G02F 1/1343; G02F 1/1335

[52] U.S. Cl. ................................. 257/59; 257/72; 349/44; 349/97; 349/106; 349/110; 349/111; 349/137; 349/138

[58] Field of Search ......................... 257/59, 72; 349/44, 349/97, 106, 110, 111, 137, 138

[56] References Cited

U.S. PATENT DOCUMENTS

| | | |
|---|---|---|
| 5,187,604 | 2/1993 | Taniguchi et al. . |
| 5,402,254 | 3/1995 | Sasano et al. . |
| 5,469,278 | 11/1995 | Takahara et al. . |
| 5,668,649 | 9/1997 | Suzuki et al. ............................. 257/59 |

*Primary Examiner*—Tom Thomas
*Assistant Examiner*—Fetsum Abraham
*Attorney, Agent, or Firm*—Antonelli, Terry, Stout & Kraus, LLP

[57] ABSTRACT

The i-type semiconductor layer (AS) and the gate insulating film (GI) are patterned along and in the same shape as the video signal lines (DL) between the video signal lines (DL) and the first transparent glass substrate (SUB1 ). The backlight is disposed on the second transparent glass substrate (SUB2) side. Therefore, signal line reflection of external light can be prevented, improving the display quality.

7 Claims, 12 Drawing Sheets step A
- FORMATION OF Al FILM (g1) BY SPUTTERING
- FORMATION OF A FIRST PHOTORESIST MASK (AL)
- ETCHING OF THE Al FILM step B
- ANODIC OXIDATION step C
- FORMATION OF ITO FILM (d1) BY SPUTTERING
- FORMATION OF A SECOND PHOTORESIST MASK (ITO)
- ETCHING OF THE ITO FILM step D

| SiN(GI) | a-Si(AS) | N-TYPE a-Si(d0) |

SUCCESSIVE CVD PROCESSED

→ step E

FORMATION OF A THIRD PHOTORESIST MASK(d0,AS,GI)

ETCHING OF a-Si FILM(d0,AS)

ETCHING OF THE SILICON NITRIDE FILM(G1)

→ step F
- FORMATION OF A Cr FILM (d2) BY SPUTTERING
- FORMATION OF Al FILM (d3) BY SPUTTERING
- FORMATION OF A FOURTH PHOTORESIST MASK (d3,d2,d0)
- ETCHING OF THE Al FILM (d3)
- ETCHING OF THE Cr FILM (d2)
- ETCHING OF THE a-Si FILM (d0)

step G
- SiN·CVD (PSV1)
- FORMATION OF A FIFTH PHOTORESIST MASK (PSV1)
- ETCHING OF THE SILICON NITRIDE FILM (PSV1)

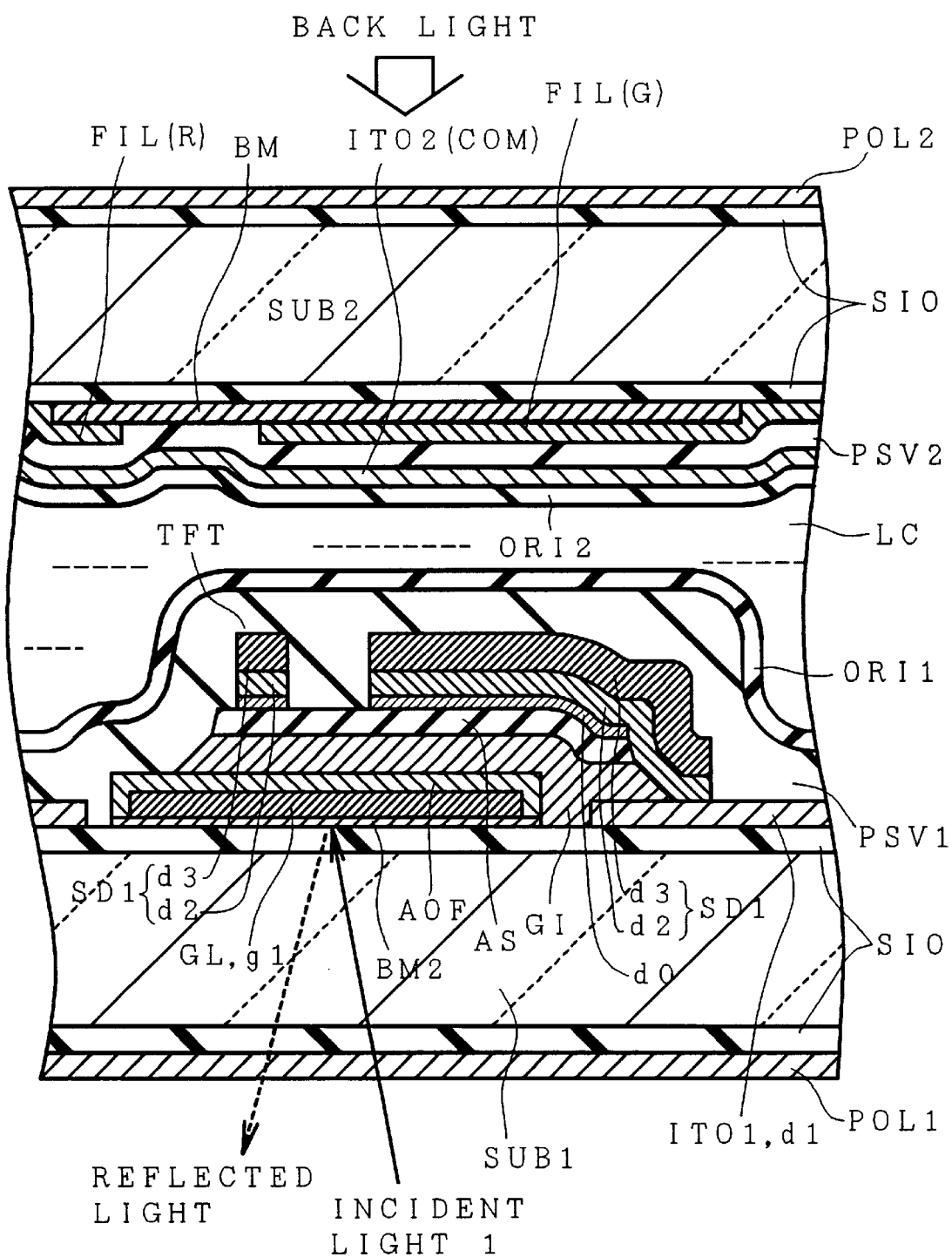

STRUCTURE OF LIQUID CRYSTAL DISPLAY DEVICE FOR ANTIREFLECTION

CROSS-REFERENCES TO RELATED APPLICATIONS

This application is a continuation of application Ser. No. 08/396,774, filed Mar. 1, 1995, now U.S. Pat. No. 5,668,649, which is a CIP of our U.S. application Ser. No. 08/255,958, filed Jul. 6, 1994, which is U.S. Pat. No. 5,541,748 the disclosure of which is hereby incorporated by reference.

BACKGROUND OF THE INVENTION

The present invention relates to a liquid crystal display of an active matrix type employing thin-film transistors (TFTs), and a method of fabricating such a liquid crystal display.

The active matrix liquid crystal display has, for example, non-linear devices (switching devices) and pixel electrodes arranged in a matrix. Because the liquid crystal at each pixel is theoretically driven continuously (duty ratio of 1.0), the active matrix type has better contrast than a so-called simple matrix type using a time-division driving method, and is therefore becoming an essential technology particularly for color liquid crystal displays. Among representative switching devices is a thin-film transistor (TFT).

The liquid crystal display device, for example, comprises: a liquid crystal display panel (liquid crystal display element); a backlight arranged beneath the liquid crystal display panel to supply light to the liquid crystal display panel; a printed circuit board arranged outside the liquid crystal display panel and formed with a liquid crystal drive circuit; a molded frame for holding these members; and a metal frame accommodating these members and formed with a liquid crystal display window. The liquid crystal display panel has two transparent glass substrates stacked together with a predetermined space therebetween in such a way that those surfaces of the two transparent glass substrates which are laminated with display pixel electrodes formed of a transparent conductive film and with an orientation film face each other. These two substrates are bonded together by a sealing material provided between, and along the edge of, the substrates like a frame. At the same time, a liquid crystal is loaded inside the frame-like sealing material between the substrates from a liquid crystal supply port formed in the sealing material and then the supply port is sealed.

The surface of a first of the two transparent glass substrates forming the liquid crystal display panel carries transparent pixel electrodes, each of which, together with a switching element or thin-film transistor, is formed in an intersection region enclosed by two adjacent scan signal lines (called gate signal lines or horizontal signal lines, extending laterally and arranged in a vertical direction, and serving as gate electrodes of thin-film transistors serving as the switching elements) and two adjacent video signal lines (called drain signal lines, data signal lines or vertical signal lines, extending vertically and arranged in a lateral direction and serving as drain electrodes of the thin-film transistors).

SUMMARY OF THE INVENTION

Problems To Be Solved by the Invention

Conventional active matrix liquid crystal display devices use low-resistance metals, such as chromium (Cr), aluminum (Al), molybdenum (Mo) and tantalum (Ta), as a material for the scan signal lines and video signal lines formed on the inner surface of the first transparent glass substrate. Thus, when the first transparent glass substrate of the liquid crystal display panel is disposed on the user side (on the display screen side or observer side), i.e., when the backlight is disposed on the second substrate side, incident light from outside the display screen is reflected outwardly by these signal lines, making the screen difficult to see (making it look like a mirror), thereby lowering the contrast and degrading the display quality. Further, some conventional devices have a gate insulating film of silicon nitride (SiNx) disposed between the transparent glass substrate and the video signal lines. This film has no color and is transparent and therefore raises a problem of reflection of external incident light.

To shield leakage light entering from between the pixel electrodes and the signal lines, black matrices are often formed around the pixel electrodes on the inner surface of the second substrate. The material for the black matrix, too, uses metals, such as chromium, so that disposing the second substrate on the user side poses similar problem of external incident light reflection.

The objective of this invention is to provide a liquid crystal display device that can reduce the problem of external incident light reflection and thereby improve display quality.

Means to Solve the Problem

To achieve the above objective, the liquid crystal display device of this invention comprises a liquid crystal display panel comprising:

a first insulating substrate having:

a plurality of scan signal lines extending horizontally and arranged in a vertical direction;

a plurality of video signal lines extending vertically and arranged in a horizontal direction; and a plurality of sets of a first pixel electrode and a switching element (for example, thin-film transistors), each set disposed in each intersection area enclosed by two of the adjacent scan signal lines and two of the adjacent video signal lines (these lines do not actually contact each other, but an intersection is apparently formed when viewed in a direction perpendicular to the substrate surface); and a second insulating substrate having second pixel electrodes disposed facing the first pixel electrodes, the first and second insulating substrates being stacked together with a predetermined gap therebetween and with a liquid crystal sealed between the two substrates;

wherein a semiconductor film, or a semiconductor film and an insulating film (the insulating film is disposed on the first insulating substrate side) are patterned along and in the same shape as the video signal lines between the video signal lines and the first insulating substrate;

wherein a backlight is arranged on the second insulating substrate side.

Another aspect of this invention is that the black matrices formed on the surface of the second insulating substrate are formed of a semiconductor film and that the backlight is arranged on the first insulating substrate side.

The semiconductor film may be formed of an amorphous silicon and the insulating film may be formed of the same material as the gate insulating film of the thin-film transistor, such as silicon oxide and silicon nitride. The width of the semiconductor film and the insulating film is made equal to or greater than the width of the video signal lines. Alternatively, the widths of the films and video line may be set to the following relation:

width of insulating film≧width of semiconductor film≧width of video signal line.

Another aspect of this invention is that the semiconductor film and the insulating film do not overlap the first pixel electrodes.

Another aspect of this invention is that the semiconductor film is formed of the same material in the same forming process as a semiconductor film that forms a channel region of the thin-film transistor.

The patterned shape of the semiconductor film is almost the same as the patterned shape of the video signal lines except in areas where the thin-film transistors are formed.

Another aspect of this invention is that the semiconductor film is formed of the same material in the same forming process as a gate insulating film of the thin-film transistor.

Another aspect of this invention is that a color filter is formed on that part of the second insulating substrate surface corresponding perpendicularly to both of the substrate surfaces and is disposed between the semiconductor film and the first pixel electrode.

A further aspect of this invention is that an antireflection film is patterned along and in the same shape as the video signal lines between the scan signal lines and the first insulating substrate.

A further aspect of this invention is that the thin-film transistors have an anti-stagger structure in which a gate electrode, a gate insulating film, a channel forming semiconductor layer, and source and drain electrodes are formed successively on the first insulating substrate.

Function

In the liquid crystal display device of this invention, when the backlight is disposed on the second insulating substrate side and the first insulating substrate is arranged on the user side (on the display screen side or observer side), because the semiconductor film or the semiconductor film and insulating film (with the insulating film arranged on the first insulating substrate side) are patterned along and in the same shape as the video signal lines, it is possible to solve the problem experienced with the conventional devices that the incident light from outside the display screen is reflected from outside (on the user side) by the video signal lines, making the screen difficult to see (making it look like a mirror), deteriorating contrast (brightness difference between black and white), and degrading the picture quality. As a result, the image quality can be improved.

In conventional liquid crystal display panels, at locations where the scan signal lines and the video signal lines cross each other when viewed in a direction perpendicular to the insulating substrate surface of the liquid crystal display panel, an amorphous silicon, the same material as the semiconductor film the for thin-film transistor channel, is locally provided during the process of forming the thin-film transistor channel to prevent a short-circuit between layers. This invention, however, provides a semiconductor film under the whole length of the video signal lines and therefore can reduce a possibility of the video signal line being broken at stepped portions formed by the semiconductor film locally provided at the intersections. This in turn reduces the cost of manufacture.

When the backlight is provided on the first insulating substrate side and the second insulating substrate is arranged on the user side, black matrices on the surface of the second insulating substrate are formed of semiconductor film so as to prevent incident light from outside the display screen from being reflected toward the outside (toward the user) to improve the image quality.

A region of the semiconductor film protruding from the side of the video signal line works as an electrode when struck by external light because the semiconductor film's conductivity increases when irradiated by light. In other words, the video signal line becomes apparently thicker, increasing the parasitic capacitance formed between it and the second pixel electrode of the second insulating substrate and therefore increasing the power consumption of the display. Hence, by making the video signal line as wide in width as the semiconductor film, an increase of power consumption can be suppressed.

The parasitic capacitance can be prevented from being produced by ensuring that the semiconductor film and the insulating film do not overlap the first pixel electrode.

The number of manufacturing steps can be prevented from increasing by forming the semiconductor film with the same material in the same process as the semiconductor film for the thin-film transistor channel region or by forming the insulating film with the same material in the same process as the gate insulating film of the thin-film transistor.

When the backlight is disposed on the second insulating substrate side and the first insulating substrate is arranged on the user side, a color filter is formed on that part of the second insulating substrate surface corresponding perpendicularly to both of the substrate surfaces and is disposed between the semiconductor film and the first pixel electrode. This arrangement prevents external light which enters from between the semiconductor film and the pixel electrode from being reflected by metal black matrices toward the user.

Further, in a case where the backlight is arranged on the second insulating substrate and the first insulating substrate is directed toward the user, an antireflection film, such as a metal oxide film and a semiconductor film, is patterned along and in the same shape as the video signal line between the scan signal line and the first insulating substrate to prevent the external light coming from the display screen side from being reflected by the scan signal line toward the outside (toward the user).

The Japan Patent Publication No. 19689/1993 (Japan Patent Laid-Open No. 170724/1986) shows a conventional technique whereby the semiconductor film is provided beneath the video signal line. This conventional technique prevents leakage of the image signal by isolating the semiconductor film from the charge holding capacitive portion by a transistor portion. The Japan Patent Laid-Open No. 52970/1987 describes a technique wherein the semiconductor film is provided under the scan signal line. While the present invention adopts an anti-stagger structure in which the gate electrode, gate insulating film, channel forming semiconductor layer and source and drain electrodes are successively formed, the cited conventional technique has another type of anti-stagger structure in which the top-bottom relation or the order of forming is inverted. Further, the Japan Patent Laid-Open No. 285464/1987 has a description to the effect that an N(+) amorphous silicon film, i-type amorphous silicon film and silicon nitride film are patterned by a single mask to reduce the number of photo processing steps. It also shows a technique that provides the semiconductor film under the video signal line. These three conventional techniques, however, do not at all consider reducing the surface reflection of external light coming from the display screen side, and no description is found therein which suggests that the substrate on which the thin-film transistor is formed be disposed on the user side.

BRIEF DESCRIPTION OF THE DRAWINGS

FIG. 12 is a cross section, similar to FIG. 3, showing a thin-film transistor and its periphery for one pixel as a fifth embodiment of this invention.

DESCRIPTION OF THE PREFERRED EMBODIMENTS

Figure 1:
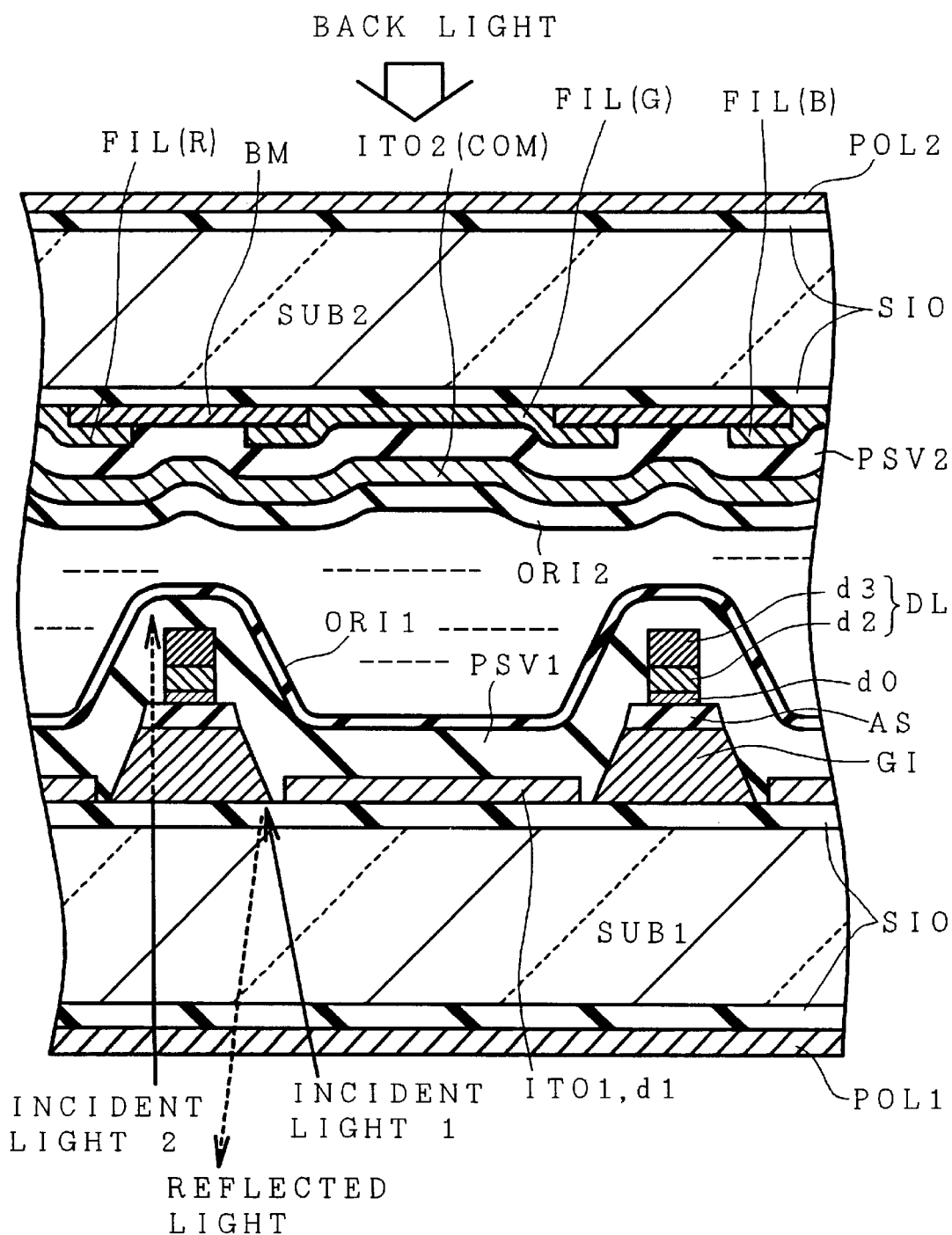
FIG. 1 is a cross section taken along the line 1—1 of FIG. 2, showing adjacent video signal lines (data lines) and a transparent pixel electrodes as a first embodiment of this invention.

The purpose and the features of the present invention will become apparent from the description taken in connection with the accompanying drawings.

EMBODIMENT 1
(Active Matrix Liquid Crystal Display)

An active matrix color liquid crystal display in a preferred embodiment according to the present invention will be described hereinafter with reference to the accompanying drawings, in which like parts are denoted by the same reference characters, and so as duplicate description thereof will be omitted.

(Configuration of the Liquid Crystal Display Module)

Figure 5:
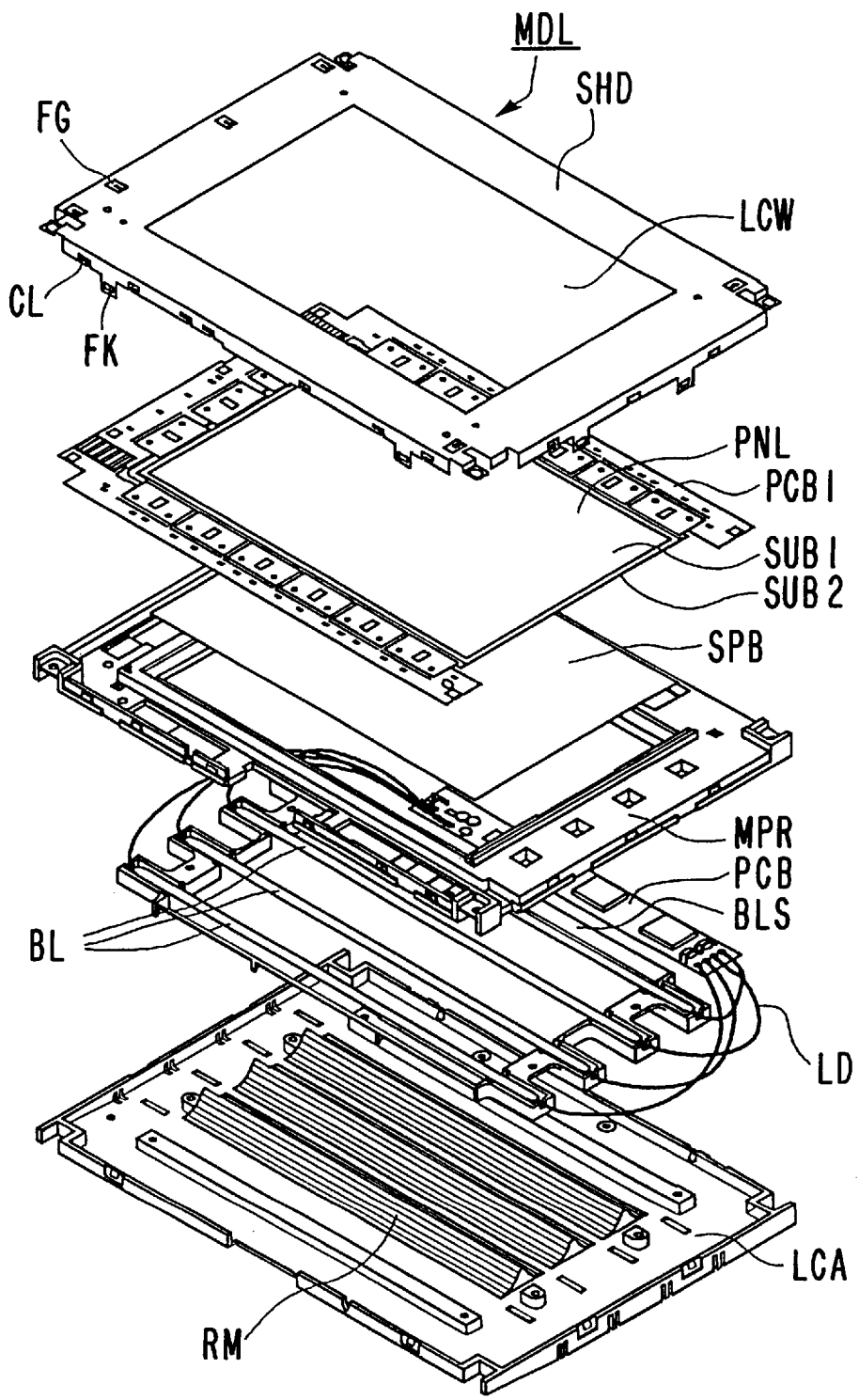
FIG. 5 is an exploded perspective view of a liquid crystal module.

FIG. 5 is an exploded perspective view showing the component parts of a liquid crystal display module.

In FIG. 5, there are shown a frame-like shield case SHD (metal frame), a display window LCW formed in the shield case SHD, a liquid crystal panel PNL, a diffusion plate SPB, an intermediate frame MFR, backlighting fluorescent lamps BL, a lamp holder BLS and a lower case LCA, which are stacked in that order to form a liquid crystal display module MDL.

Those components of the liquid crystal display module MDL are fastened together with claws CL and hooks PK formed on the shield case SHD.

The intermediate frame MFR is provided with an opening corresponding to the display window LCW, recesses and projections corresponding to the shapes and sizes of the lamp holder BLS and the circuit components, and heat releasing openings.

The lower case LCA serves also as a reflector for reflecting the light emitted by the backlighting fluorescent lamps and is provided with reflecting ridges RM at positions corresponding to the fluorescent lamps BL for efficient reflection.

Denoted SUB1 and SUB2 are first and second transparent glass substrates making up the liquid crystal display panel PNL. As will be detailed later, the first transparent glass substrate SUB1 (lower transparent glass substrate) holds thin-film transistors, scan signal lines, video signal lines and transparent pixel electrodes on its surface, and the second transparent glass substrate SUB2 (upper transparent glass substrate) holds color filters and common transparent pixel electrodes on its surface black matrices. In this embodiment, as shown in the figure, the backlight BL is disposed on the second transparent glass substrate SUB2 side.

(Outline of Matrix Portion)

Figure 3:
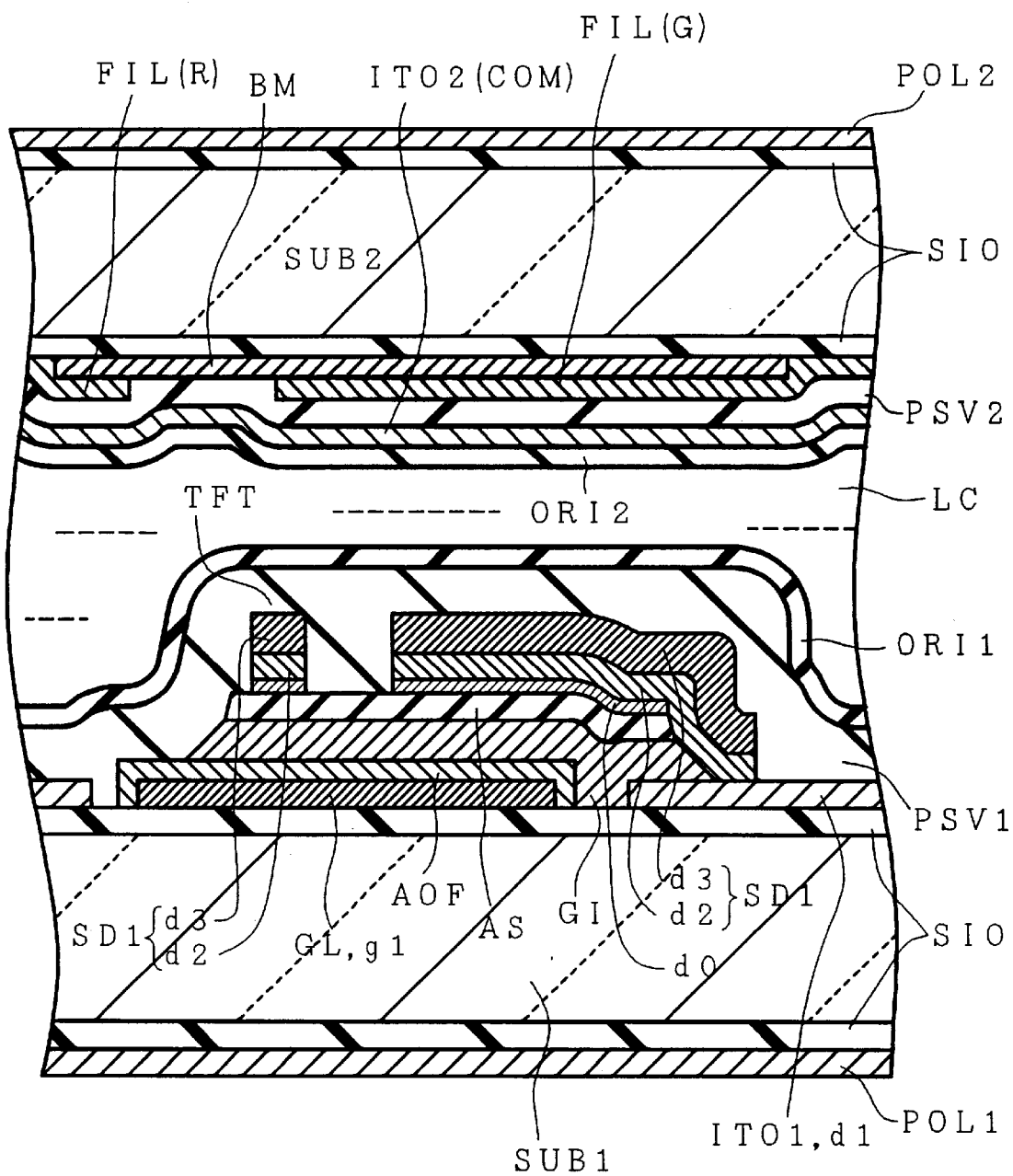
FIG. 3 is a cross section of thin-film transistor and its periphery for one pixel, taken along the line 3—3 of FIG. 1.
Figure 4:
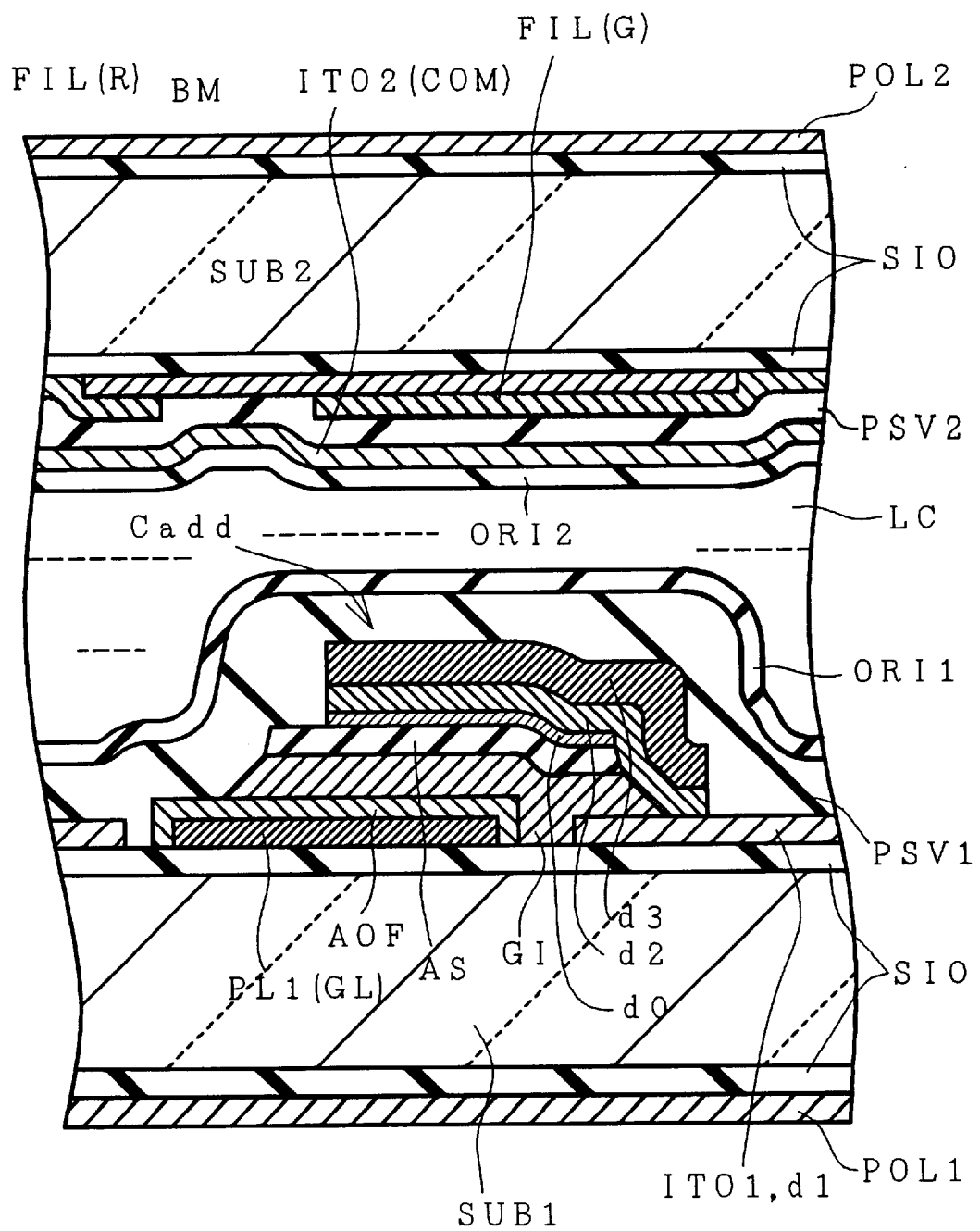
FIG. 4 is a cross section of an additional capacitor Cadd taken along the line 4—4 of FIG. 1.

FIG. 1 is a plan view showing one pixel and its periphery in the active-matrix type color liquid crystal display device to which this invention is applied. FIG. 1 is a cross section showing adjacent video signal lines and a transparent pixel electrode, taken along the line 1—1 of FIG. 2. FIG. 3 is a cross section taken along the line 3—3 of FIG. 2. FIG. 4 is a cross section taken along the line 4—4 of FIG. 2.

Figure 2:
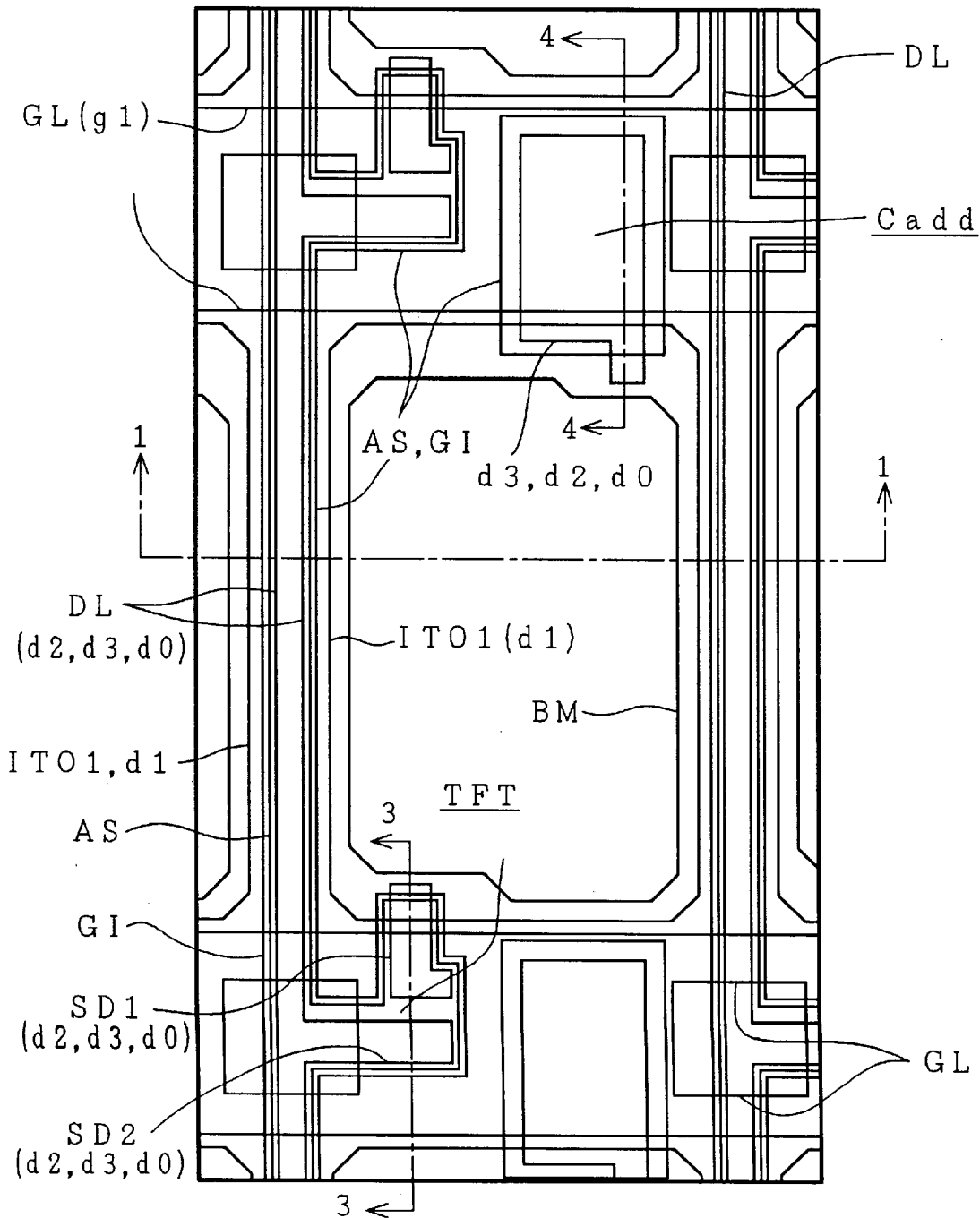
FIG. 2 is a fragmentary plan view showing one pixel and its periphery in the liquid crystal display section of the active-matrix type color liquid crystal display device to which the present invention is applied.

As shown in FIG. 2, each pixel is disposed inside an area of intersection (a region enclosed by four signal lines) between adjacent scan signal lines GL (gate lines or horizontal signal lines) and adjacent video signal lines DL (data lines, drain lines or vertical signal lines). Each pixel includes a thin-film transistor TFT, a transparent pixel electrode ITO1 and an additional capacitor Cadd. The scan signal lines GL each branch into two lines near the intersection with the video signal lines DL so that when one of the branched lines at this portion is short-circuited with the video signal lines DL, the shorted line is cut off by a laser and taken over by the remaining line (not cut off) to prevent a line failure and thereby ensure normal operation.

As shown in FIG. 3, the thin-film transistor TFT and the transparent pixel electrode ITO1 are formed on the side of a lower transparent glass substrate SUB1 with respect to a liquid crystal layer LC, and a color filter FIL and a shading film (black matrix) BM are formed on the side of an upper transparent glass substrate SUB 2 with respect to the liquid crystal layer LC. The opposite surfaces of the transparent glass substrates SUB1 and SUB2 are coated with silicon dioxide films SIO formed by a dipping process.

The shading film BM, the color filter FIL, a protective film PSV2, a transparent common pixel electrode ITO2 (COM) and an upper orientation film ORI2 are formed sequentially in that order on the inner surface, i.e., the surface on the side of the liquid crystal layer LC of the second transparent glass substrate SUB2. Designated POL1 and POL2 are polarizing plates formed on the outer surfaces of the first transparent glass substrates SUB1, SUB2.

(Thin-Film Transistor TFT)

Next, by referring to FIG. 1 to 3, the structure on the first transparent glass substrate SUB1 side will be explained in detail. When a positive bias is applied to the scan signal lines GL, the resistance between source and drain becomes small. When the bias is set to zero, the channel resistance increases.

Each pixel is provided with one thin-film transistor TFT formed on the gate line GL as shown in FIG. 2. The gate electrode, i.e., the gate line GL, is coated with an anodic oxide film AOF formed by anodizing the gate line GL, and a silicon nitride insulating film GI. The anodic oxide film AOF and the silicon nitride insulating film-GI form a gate insulating layer. An i-type semiconductor layer AS formed of i-type amorphous silicon (Si), i.e., intrinsic silicon not doped with any type determining impurity, a pair of source electrodes SD1 and a pair of drain electrodes SD2 are formed on the gate insulating layer. The source and the drain are identified by their bias polarities, and the bias polarities are inverted during the operation of the liquid crystal display. Accordingly, it is to be understood that the source and the drain interchange with each other during the operation of the liquid crystal display. However, in the following description, one of the layers will be constantly referred to as a source and the other will be constantly referred to as a drain as a matter of convenience.

(Gate Electrode (Gate Line GL))

In this embodiment, a single-layer first conductive film g1 forms the gate lines GL. The first conductive film g1, for example, is a sputtered aluminum (Al) film. The first conductive film g1 is coated with the anodic oxide film AOF, i.e., an aluminum oxide film.

(Insulating Film GI)

An insulating film GI is used together with the anodic oxide film AOF as a gate insulating film to apply an electric field created by the gate line GL to the semiconductor layer AS in the thin-film transistor TFT. The insulating film GI, for example, is a silicon nitride film of a thickness in the range of 1200 to 2700-Å (in this embodiment, about 2000-Å) formed by plasma CVD. The insulating film GI is formed in areas corresponding to the thin-film transistor TFT, the additional capacitor Cadd, the source electrode SD1, the drain electrode SD2 and the data line DL. The insulating film GI is formed in a pattern having an isolated land corresponding to the additional capacitor Cadd, and extending along the drain electrode SD2 and the data lines DL, which is one of the features of the present invention. The gate lines GL are not coated entirely with the insulating film GI, and part of the insulating film GI, similarly to the semiconductor layer AS, is removed from the data lines DL adjacent to the additional capacitor Cadd and the source electrode SD1 is removed by patterning. Part of the gate line GL not coated with the insulating film GI is coated with the anodic oxide film AOF.

(I-type Semiconductor layer AS)

The i-type semiconductor layer AS is formed in areas corresponding to the thin-film transistor TFT, the additional capacitor Cadd, the source electrode SD1 and the drain electrode SD2 in a pattern having an isolated land corresponding to the additional capacitor Cadd and extending along the drain electrode SD2 and the data lines DL. The gate lines GL are not coated entirely with the semiconductor layer AS, and part of the semiconductor layer AS, similar to the insulating film GI, is removed from the data lines DL adjacent to the additional capacitor Cadd and the source electrode SD1. The semiconductor layer AS is an amorphous silicon layer having a thickness in the range of 200 to 2200-Å (in this embodiment, about 2000-Å). An ohmic contact layer d0 is an n+-type amorphous silicon layer doped with phosphorus (P), and is formed so as to overlie only the i-type semiconductor layer AS and underlies only a conductive layer d2 (d3).

The i-type semiconductor layer AS is formed to separate the gate lines and the data lines at their intersections and to separate the gate lines, and the source electrode SD1, the drain electrode SD2 and the additional capacitor Cadd at their intersections for insulation together with the anodic oxide film AOF and the insulating film GI to prevent short-circuiting. The n+-type amorphous silicon layer do, the i-type semiconductor layer AS and the insulating film GI are formed in an area under the source electrode SD1 and over the transparent pixel electrode ITO1 (d1), which is one of the features of the present invention. This feature prevents the breakage of the source electrode SD1 connected to the transparent pixel electrode ITO1 (d1). Even if the source electrode SD1 and the drain electrode SD2 are not patterned correctly and even if the source electrode SD1 and the drain electrode SD2 remain only over the anodic oxide film AOF on the gate lines GL, the anodic oxide film AOF has a sufficient dielectric strength to prevent short circuits, which is one of the features of the present invention.

In this embodiment, the semiconductor layer AS and the insulating film GI underlying the data lines DL extend over the transparent pixel electrode ITO1 and insulates the data lines DL and the transparent pixel electrode ITO1 from each other, which also is one of the features of the present invention. Accordingly, even if the data lines DL and the transparent pixel electrode ITO1 are arranged close to each other to provide a bright liquid crystal display having a large numerical aperture, a short circuit between the data lines DL and the transparent pixel electrode ITO1 (d1) can be prevented.

Since a single photoresist pattern is used for forming both the semiconductor layer AS and the insulating film GI, the number of photolithographic etching processes for forming the semiconductor layer AS and the insulating film GI in this embodiment is smaller than that of the photolithographic etching processes in which different photoresist patterns are used respectively for forming the semiconductor layer AS and the insulating film GI. The probability of short circuit between the data lines and the transparent pixel electrode ITO1 (d1) when both the semiconductor layer AS and the insulating film GT are used for insulating the data lines DL and the transparent pixel electrode ITO1 (d1) from each other is lower than that when only the insulating film GI is used for the same purpose, because the dielectric strength of the insulating film GI is reduced due to the insufficient selection ratio of the insulating film GI during the etching of the semiconductor layer AS when the semiconductor layer AS and the insulating film GI are processed by separate photolithographic etching processes and the i-type semiconductor layer AS underlying the data lines DL is not formed over the transparent pixel electrode ITO1 (d1).

(Transparent Pixel Electrode ITO1)

The transparent pixel electrode ITO1 is one of the pixel electrodes of the liquid crystal display panel. The transparent pixel electrode ITO1 is connected to the source electrode SD1 of the thin-film transistor TFT. The first conductive film d1 forms the transparent pixel electrode ITO1. The first conductive film d1 is a transparent conductive film of ITO (indium tin oxide), i.e., NESA film, having a thickness in the range of 1000 to 2000-Å (in this embodiment, about 1400-Å).

(Source Electrode SD1 and Drain electrode SD2)

Each of the source electrode SD1 and the drain electrode SD2 consists of a second conductive film d2 in contact with the n+-type semiconductor layer d0, and a third conductive film d3 overlying the second conductive film d2.

The second conductive film d2 is a chromium (Cr) film formed by sputtering and having a thickness in the range of 500 to 1000-Å (in this embodiment, about 600-Å). The Cr film adheres firmly to the n+-type semiconductor layer d0 and serves as a barrier layer to prevent the diffusion of the third conductive film d3, i.e., an Al film, into the n+-type semiconductor layer d0. A film of a metal having a high melting point, such as Mo, Ti, Ta or W, or a film of a metal silicide having a high melting point, such as MoSi2, TiSi2, TaSi2 or WSi2, may be used instead of the Cr film as the second conductive film d2.

The third conductive film d3 is an Al film formed by sputtering and having a thickness in the range of 3000 to 5000-Å (in this embodiment, about 4000-Å) by sputtering. The stress induced in the Al film is smaller than that induced in the Cr film; thus, the Al film can be formed in a comparatively large thickness, is suitable for forming the source electrode SD1, the drain electrode SD2 and the data lines DL having a comparatively low resistance, and is capable of being formed in a high step coverage in covering stepped parts formed by the gate lines GL.

Although each of the source electrodes SD1 and the drain electrode SD2 in this embodiment has a laminated structure consisting of the second conductive film d2 and the third conductive film d3, the third conductive film d3 may be omitted and each of the source electrode SD1 and the drain electrode SD2 may be formed of only the second conductive film d2 of Cr or a metal having a high melting point. When only the second conductive film is used, the thickness of the second conductive film must be on the order of 1800-Å.

After patterning the second conductive film d2 and the third conductive film d3 by using a single masking pattern, portions of the n+-type semiconductor layer d0 remaining over the i-type semiconductor layer AS are removed by using the same masking pattern or by using the second conductive film d2 and the third conductive film d3 as a mask. Although the surface of the i-type semiconductor layer AS is etched slightly in completely removing the portions of the n+-type semiconductor layer d0 by etching, the degree of etching of the surface of the i-type semiconductor layer AS may be adjusted by properly determining the etching time.

(Data Lines DL)

The data lines DL are formed by patterning the second conductive film d2 and the third conductive film d3 forming the source electrode SD1 and the drain electrode SD2. The data lines may be formed only of the second conductive film d2.

(Protective Film PSV1)

The thin-film transistor TFT and the transparent pixel electrode ITO1 are covered with a highly transparent, moisture-resistant protective film PSV1 principally for protecting the thin-film transistor TFT from moisture. The protective film PSV1 is a silicon dioxide film or a silicon nitride film formed by plasma CVD and having a thickness on the order of 1 $\mu$m. Generally, the protective film is formed by a vacuum apparatus, such as a plasma CVD apparatus, which improves the throughput as compared with a protective film formed of an organic material, such as an epoxy resin.

(Shading Film BM)

The shading film BM is formed on the second transparent glass substrate SUB2 to shade the i-type semiconductor layer AS from external light or backlight. The inner side of a closed polygonal contour of the shading film BM shown in FIG. 2 is an opening in which the shading film BM is not formed. The shading film BM is a film having a high light intercepting property, such as an Al film or a Cr film. In this embodiment, the shading film BM is a Cr film of about 1300-Å in thickness formed by sputtering.

Thus, the channel region of the i-type semiconductor layer AS extending between the source electrode SD1 and the drain electrode SD2 of the thin-film transistor TFT is sandwiched between the shading film BM and the comparatively large gate line GL, so that the channel region is shaded from external light or backlight. The shading film BM is formed in a grid pattern, i.e., a black matrix, so as to surround the pixels to define the effective display area of each pixel. Since the contour of each pixel is defined by the shading film BM, a picture can be displayed in a high contrast. Thus, the shading film BM serves as both a shading film for shading the i-type semiconductor layer AS and a black matrix.

Since the edge of the base end of the transparent pixel electrode ITO1 with respect to the rubbing direction, i.e., part of the transparent pixel electrode ITO1 in the lower right-hand corner of FIG. 2, is shaded by the shading film BM, the displaying characteristics of the liquid crystal display does not deteriorate even if a domain is formed in the edge, because the domain is hidden.

The shading film BM is formed in the shape of a frame along the periphery and has a pattern corresponding to the pattern of the matrix array having a plurality of openings, i.e., dots, as shown in FIG. 2. The peripheral part of the shading film BM extends outward beyond the sealing film SL to shield the matrix array from leakage light, such as reflected light reflected by an apparatus, such as a personal computer, into which the liquid crystal display is incorporated. On the other hand, the shading film BM is formed so that the periphery thereof is about 0.3 to 1 mm on the inside of the edges of the substrate SUB2 and is separated from the cutting lines of the substrate SUB2.

(Color Filter FIL)

The color filter FIL as shown as FIG. 1, 3 has red stripes, green stripes and blue stripes arranged in rotation at positions corresponding to the pixels. The color filter FIL is formed so as to cover the transparent pixel electrode ITO1 entirely, and the shading film BM is formed on the inside of the periphery of the transparent pixel electrode ITO1 so as to overlap the edges of the color filter FIL and the transparent pixel electrode ITO1.

When forming the color filter FIL, first a coloring base film of an acrylic resin or the like is formed over one of the major surfaces of the upper transparent glass substrate SUB2. Then, portions of the coloring base film are dyed in red and the dye is fixed to form red stripes R, and then the same process is repeated and a green dye and a blue dye are used to form green stripes G and the blue stripes B.

(Protective Film PSV2)

The protective film PSV2 prevents the diffusion of the dyes of the color filter FIL into the liquid crystal layer LC. The protective film PSV2 is formed of a transparent resin, such as an acrylic resin or an epoxy resin.

(Common Transparent Pixel Electrode ITO2)

Figure 8:
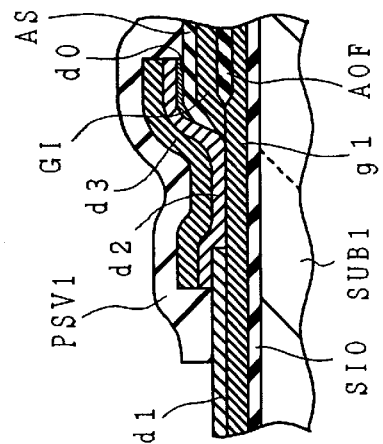
FIG. 8 is a flow chart, for the pixel portion and the gate terminal portion, representing the manufacturing steps F and G on the substrate SUB1 side.
Figure 8:
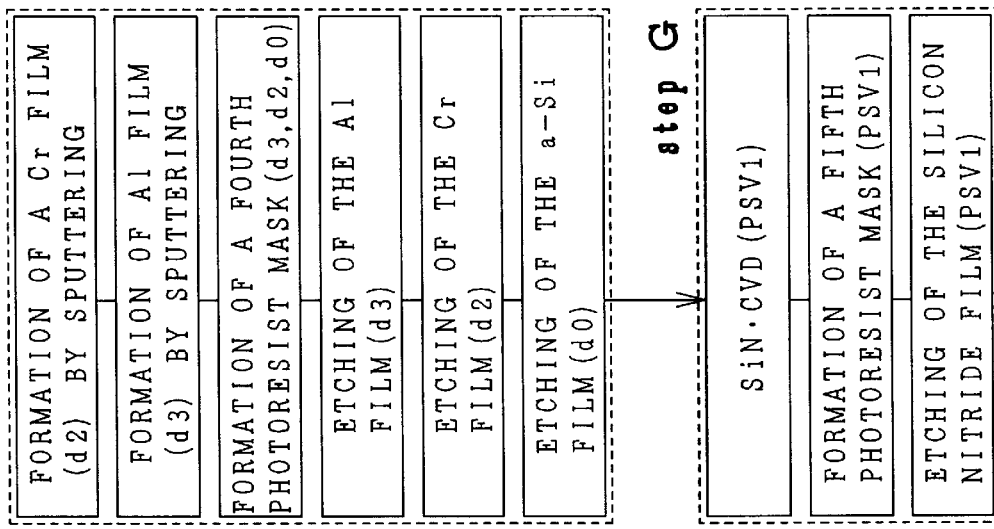
Figure 8:
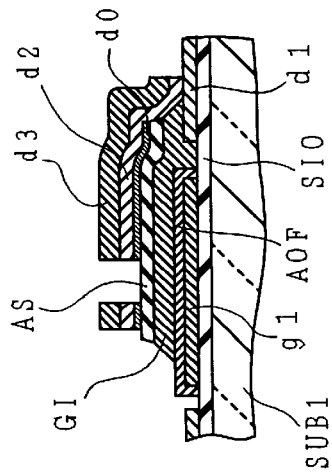
Figure 8:
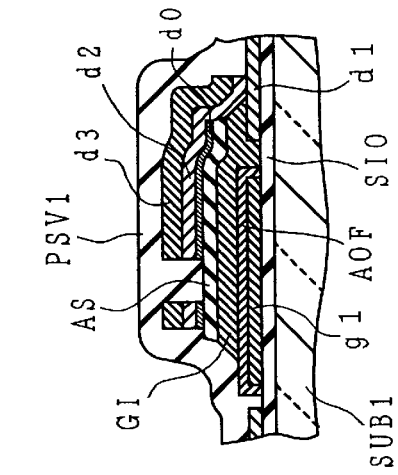
Figure 9:
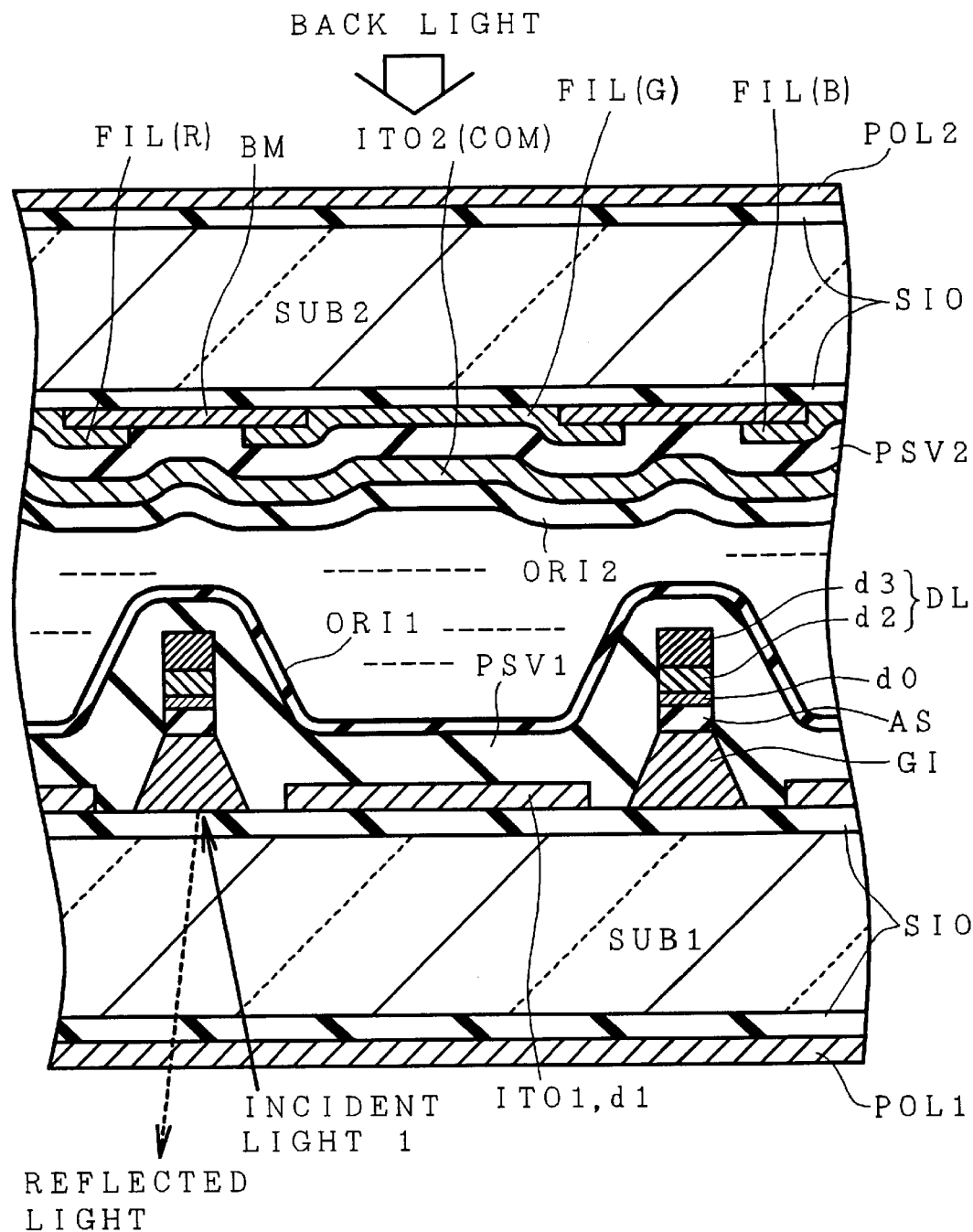
FIG. 9 is a cross section, similar to FIG. 1, showing adjacent video signal lines and a transparent pixel electrode, as a second embodiment of this invention.

The transparent common pixel electrode ITO2 is disposed opposite to the transparent pixel electrodes ITO1 formed on the lower transparent glass substrate SUBl so as to correspond respectively to pixels. The optical condition of a portion of the liquid crystal layer LC changes according to the potential difference (electric field) between the corresponding transparent pixel electrode ITO1 and the transparent common pixel electrode ITO2. A common voltage Vcom is applied to the transparent common pixel electrode ITO2. In this embodiment, the common voltage Vcom is the middle dc voltage between a lowest driving voltage Vdmin and a highest driving voltage Vdmax applied to the data lines DL. If it is desired to reduce the supply voltage applied to the integrated circuit of a data line driving circuit by about half, an ac voltage is applied to the transparent common pixel electrode ITO2. FIGS. 8 and 9 show the shape of the transparent common pixel electrode ITO2 in plan views.

(Construction of the Additional Capacitor Cadd)

The transparent pixel electrode ITO1 has one end connected to the thin-film transistor TFT and the other end overlapping the adjacent gate line GL. As is apparent from FIG. 4, the thus overlapping end of the transparent pixel electrode ITO1 and the adjacent gate line GL form the additional capacitor Cadd having an electrode PL2 of a laminated construction consisting of the second conductive film d2 and the third conductive film d3 forming the source electrode SD1 connected to the transparent pixel electrode ITO1, and the drain electrode SD2, and another electrode PL1 which is a part of the adjacent gate line GL. The anodic oxide film AOF serving as the gate insulating film of the thin-film transistor TFT, the insulating film GI, the i-type semiconductor layer AS and the n+-type semiconductor layer d0 serve as the dielectric film of the additional capacitor Cadd, which is an important feature of this embodiment; that is, the anodic oxide film AOF, the insulating film GI, the i-type semiconductor layer AS and the n+-type semiconductor layer d0 are superposed at the intersection of the gate electrode GT (gate line GL) and the drain electrode SD2, at the intersections of the gate lines GL and the data lines DL, at the intersection of the gate line GL and the source electrode, and between the electrodes of the additional capacitor Cadd. Since the insulating film GI, the i-type semiconductor layer AS and the n+-type semiconductor layer d0 formed successively by plasma CVD processes between the electrodes of the additional capacitor are not removed by etching, defects causing short circuits (point defects) are reduced.

(Prevention of Video Signal Line DL Reflection)

The liquid crystal display module MDL of this embodiment, as shown in FIG. 5, has the backlight BL disposed on the side of the second transparent glass substrate SUB2 making up the liquid crystal display panel PNL, with the first transparent glass substrate SUB1, on which the thin-film transistor TFT and the video signal lines DL are formed, disposed on the user side. In the active-matrix type liquid crystal display panel PNL that uses the anti-stagger structure in which the gate electrode, gate insulating film, channel-forming semiconductor layer, and source and drain electrodes are successively formed on the first transparent glass substrate SUBI, the i-type semiconductor layer AS made of amorphous silicon and the gate insulating film GI are patterned along and in the same shape of the video signal lines DL between the video signal lines DL and the first transparent glass substrate SUBI, as shown in FIG. 1. The gate insulating film GI is formed between the i-type semiconductor layer AS and the first transparent glass substrate SUB1, and the i-type semiconductor layer AS and gate insulating film GI have the same pattern as the video signal lines DL (d3, d2) but are wider than and extend along the pattern of the video signal lines DL except where the thin-film transistors TFF exist. An amorphous silicon semiconductor layer is brown in color and has such a large light adsorption that in FIG. 1, the external incident light 1, 2 is absorbed by the i-type semiconductor layer AS, and hence is not reflected nor passes through as shown by the broken line. In this way, by interposing the i-type semiconductor layer AS between a second conductive film d2 of chromium, having a high reflection factor, that forms the video signal lines DL and the first transparent glass substrate SUB1, it is possible to solve the problem that the external incident light from the display screen side is reflected toward the outside (toward the user) by the video signal lines DL, making the screen difficult to see (making it look like a mirror), lowering the contrast (luminance difference between black and white) and deteriorating the display quality. That is, this arrangement improves contrast and image quality. Further, this obviates the need for a costly antireflection coating on the polarizing plate POL1 used to prevent display quality degradation caused by reflected light from the display screen side and therefore can reduce the manufacturing cost.

Further, because the i-type semiconductor layer AS is provided under the entire length of the video signal lines DL, it is possible to reduce the possibility of the video signal lines DL being broken at the stepped portions produced by the i-type semiconductor layer AS, which conventionally has been provided only locally at the intersections between the scan signal lines GL and the video signal lines DL to prevent short-circuit between them. As a result, the manufacturing cost is further reduced. When the transparent pixel electrode ITO1 overlaps the i-type semiconductor layer AS and gate insulating film GI, a parasitic capacitance is produced between the video signal line DL and the transparent pixel electrode ITO1. In this embodiment, because the transparent pixel electrode ITO1 is not overlapped by the i-type semiconductor layer AS nor by the gate insulating film GI, as shown in FIG. 1, no parasitic capacitance is generated. It is noted that an N(+) type semiconductor layer d0 is formed between the video signal lines DL and the i-type semiconductor layer AS. The i-type semiconductor layer AS and the gate insulating film GI formed between the video signal lines DL and the first transparent glass substrate SUB1 are made from the same material and in the same process as the thin-film transistor TFT channel forming i-type semiconductor layer AS and gate insulating film GI. Hence, the number of manufacturing steps does not increase.

Furthermore, with this embodiment, the i-type semiconductor layer AS, when seen from the user, covers the video signal lines DL with an alignment margin as shown in FIG. 1, it is possible to eliminate non-uniform display that may otherwise be caused by variations of the pixel alignment between them.

(Method of Manufacture)

Next, the method of fabricating the liquid crystal display device on the first transparent glass substrate SUB1 side will be described by referring to FIGS. 6 to 8. In these figures, the letters shown at the center represent the abbreviations of processing steps, with the cross sections shown to the left representing the process flow of the pixel portion of FIG. 3 and with those shown to the right representing the process flow of the gate terminal and its periphery. Process steps A to G except for step B and D correspond to each step of photo processing, and the cross sections in each step represent the state when the photo processing is finished with photoresist removed. In the following description, the photo processing is meant to represent a series of works from application of photoresist and selective exposure using a mask to the development of the exposed area. Now, each of the process steps will be explained.

Figure 6:
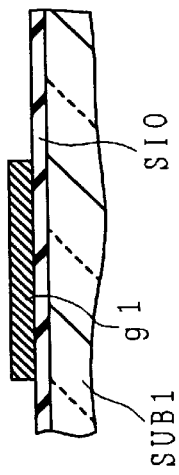
FIG. 6 is a flow chart, for a pixel portion and a gate terminal portion, representing the manufacturing steps A to C on the substrate SUB1 side.
Figure 6:
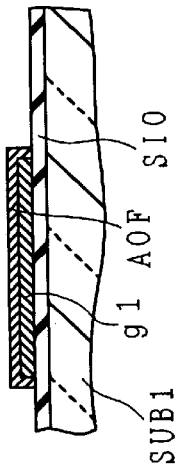
Figure 6:
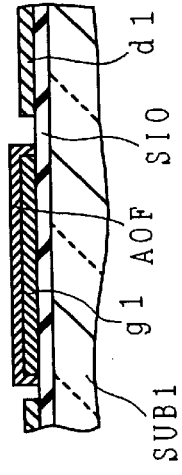
Figure 6:
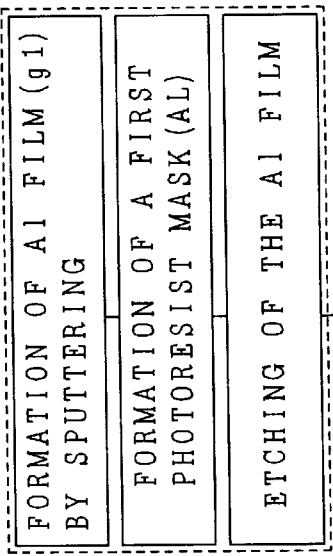
Figure 6:
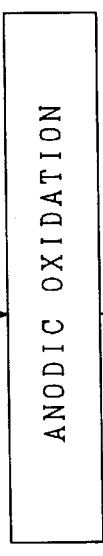
Figure 6:
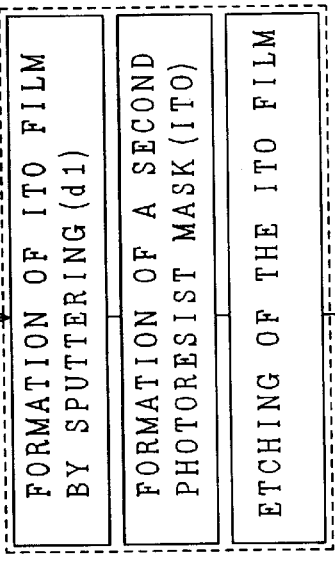

Step A (FIG. 6)

Silicon dioxide films SIO are formed over both major surfaces of the lower transparent glass substrate SUB1 of 7059 glass by dipping, and then the silicon dioxide films SIO are baked at 500° C. for sixty minutes. The silicon dioxide films SIO are formed to reduce the irregularities in the surfaces of the lower transparent glass substrate SUB1 and may be omitted when the surfaces of the lower transparent glass substrate SUB1 are satisfactorily smooth. Then, a 2000-Å thick second conductive film g2 of Al/Ta, Al/Ti/Ta, Al/Pd or such is formed by sputtering over the silicon dioxide film SIO. After forming an etching mask by a photolithographic process, the first conductive film g1 is etched selectively with an etchant containing phosphoric acid, nitric acid and glacial acetic acid.

Step B (FIG. 6)

After forming a resist film (after forming the pattern AO for anodic oxidation), the lower transparent glass substrate SUB1 is immersed in an anodizing bath prepared by adjusting the acidity of a 3% tartaric acid solution to pH 6.24±0.05 by ammonia and diluting the 3% tartaric acid solution with a ethylene glycol solution in a dilution ratio of 1/9, and the formation current density is adjusted to 0.5 mA/cm2 (constant-current formation). Anodic oxidation is continued until the formation voltage reaches 125V at which an Al2O3 film of a desired thickness is formed. It is desirable to hold the lower transparent glass substrate SUB1 in this state for several tens of minutes (constant-voltage formation) to form a uniform Al2O3 film. Thus, the conductive film g1 is anodized and a 1800-Å thick anodic oxide film AOF is formed over the upper and side surfaces of the gate lines GL. The anodic oxide film AOF serves as part of the gate insulating film of the thin-film transistors TFT.

Step C (FIG. 6)

The conductive film d1 formed of ITO film 1400-Å thick is deposited by sputtering. After photo processing, the conductive film d1 is selectively etched by a mixture of hydrochloric acid and nitric acid as an etching liquid to form gate terminals GTM (scan circuit connection terminals), the uppermost layer of drain terminals DTM (video signal circuit connection terminals) and transparent pixel electrodes ITO1.

Figure 7:
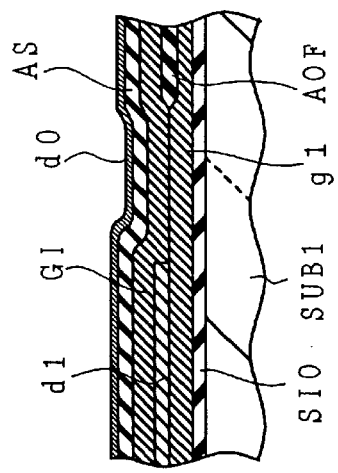
FIG. 7 is a flow chart, for the pixel portion and the gate terminal portion, representing the manufacturing steps D and E on the substrate SUB1 side.
Figure 7:
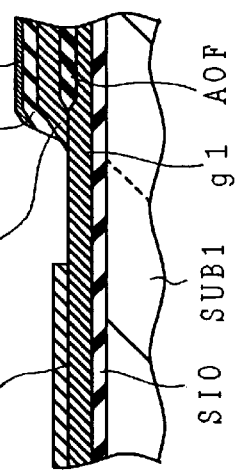
Figure 7:
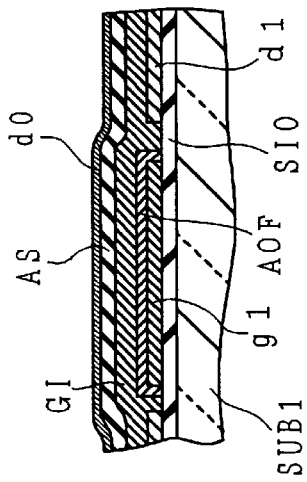
Figure 7:
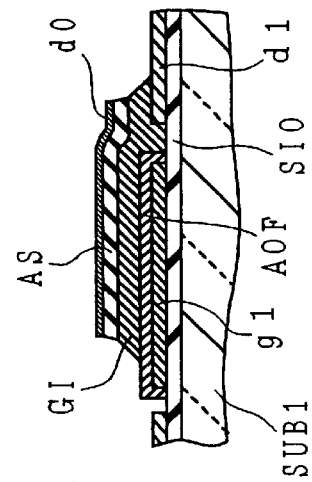

Step D (FIG. 7)

A 2000-Å thick silicon nitride film is formed on a plasma CVD apparatus by using ammonia gas, silane gas and nitrogen gas, a 2000-Å thick i-type amorphous silicon film is formed on the plasma CVD apparatus by using silane gas and hydrogen gas, and then a 300-Å thick n+-type amorphous silicon film is formed on the plasma CVD apparatus by using hydrogen gas and phosphine gas. These films are formed successively in different reaction chambers of the plasma CVD apparatus.

Step E (FIG. 7)

After forming an etching mask by a photolithographic process, the n+-type amorphous silicon film and the i-type amorphous silicon film are etched with an etching gas containing SF6 and CCl4, and then the silicon nitride film is etched with SF6 gas. Naturally, the n+-type amorphous silicon film, the i-type amorphous silicon film and the silicon nitride film may be successively etched with SF6 gas.

The successive etching of the three layered films formed by CVD with etching gases containing SF6 as a principal component is a feature of the liquid crystal display fabricating method in this embodiment. The increasing order of etching rate of those films with SF6 gas corresponds to the order of the n+-type amorphous silicon film, the i-type amorphous silicon film and the silicon nitride film. Therefore, when the etching of the i-type amorphous silicon film is started after the completion of etching of the n+-type amorphous silicon film, the n+-type amorphous silicon film is side-etched and, consequently, the edges of the amorphous silicon film are inclined at an inclination of about 70°. When the etching of the silicon nitride film starts after the completion of the etching of the i-type amorphous silicon film, the n+-type amorphous silicon film and the i-type amorphous silicon film overlying the silicon nitride film are side-etched in that order and, consequently, the edges of the i-type amorphous silicon film and the silicon nitride film are inclined at inclinations of about 50° and about 20°, respectively. Since the edges of those films are inclined, the probability of breakage of the source electrodes SD1 to be formed over those films is reduced remarkably. Although the edges of the n+-type amorphous silicon film are inclined at an inclination nearly equal to 90°, breakage of the film overlying the n+-type amorphous silicon film rarely occurs because the same film is as thin as about 300-Å. Thus, strictly speaking, the n+-type amorphous silicon film, the i-type amorphous silicon film and the silicon nitride film are not the same in planar pattern; the patterns of the n+-type amorphous silicon film, the i-type amorphous silicon film and the silicon nitride film are greater in that order because the edges of the films are inclined.

Step F (FIG. 8)

A 600-Å thick second conductive film d2 of Cr is formed by sputtering, and then a 4000-Å thick third conductive film d3 of Al/Pd, Al/Si, Al/Ta or Al/Ti/Ta is formed over the second conductive film d2 by sputtering. After forming an etching mask by a photolithographic process, the third conductive film d3 is etched with the same etchant as that used in the Step A, and then the second conductive film d2 is etched with a ceric ammonium nitrate solution to form data lines, source electrodes SD1 and drain electrodes SD2.

Since edges of the n+-type amorphous silicon film, the i-type amorphous silicon film and the silicon nitride film are inclined in the Step E, the data lines DL may be formed only of the second conductive film d2 if the liquid crystal display has a large allowance for the resistance of the data lines DL. Then, the n+-type amorphous silicon film d0 is etched with SF6 gas and CCl4 gas on a dry etching apparatus to remove portions of the same lying between the source electrodes and the drain electrodes selectively.

Step G (FIG. 8)

A 1 μm thick silicon nitride film is formed on a plasma CVD apparatus by using ammonia gas, silane gas and nitrogen gas. After forming an etching mask by a photolithographic process over the silicon nitride film, the silicon nitride film is processed for dry etching by using SF6 gas to form a protective film PSV1. The protective film may be formed of an organic material instead of the silicon nitride formed by CVD.

EMBODIMENT 2
(Prevention of Video Signal Lines DL Reflection)

FIG. 9 is a cross section, similar to FIG. 1, showing adjacent video signal lines and a transparent pixel electrode in the second embodiment.

This embodiment has almost the same configuration of the first embodiment shown in FIG. 1, except that the widths of the i-type semiconductor layer AS and the gate insulating film GI are equal to those of the video signal lines DL (d3, d2). It is needless to say that this embodiment, too, has the advantages of the video signal line DL reflection prevention, improved contrast and improved image quality, similar to those of the first embodiment. Areas of the i-type semiconductor layer AS protruding from the sides of the video signal line DL work as an electrode when struck by light because the i-type semiconductor layer AS when irradiated by light increases its conductivity. That is, the video signal line DL becomes apparently, thereby increasing the parasitic capacitance formed between it and the common transparent pixel electrode ITO2, and therefore increasing the power consumption of the display. In order words, by forming the i-type semiconductor layer AS so that its width is equal to that of the video signal line DL, it is possible to limit an increase in power consumption.

In the manufacturing method of this embodiment, a step ranging from a 4'-th photo processing to a-Si·SiN etch is added between the step (F) and (G) of FIG. 8.

EMBODIMENT 3
(Prevention of Black Matrix BM Reflection)

Figure 10:
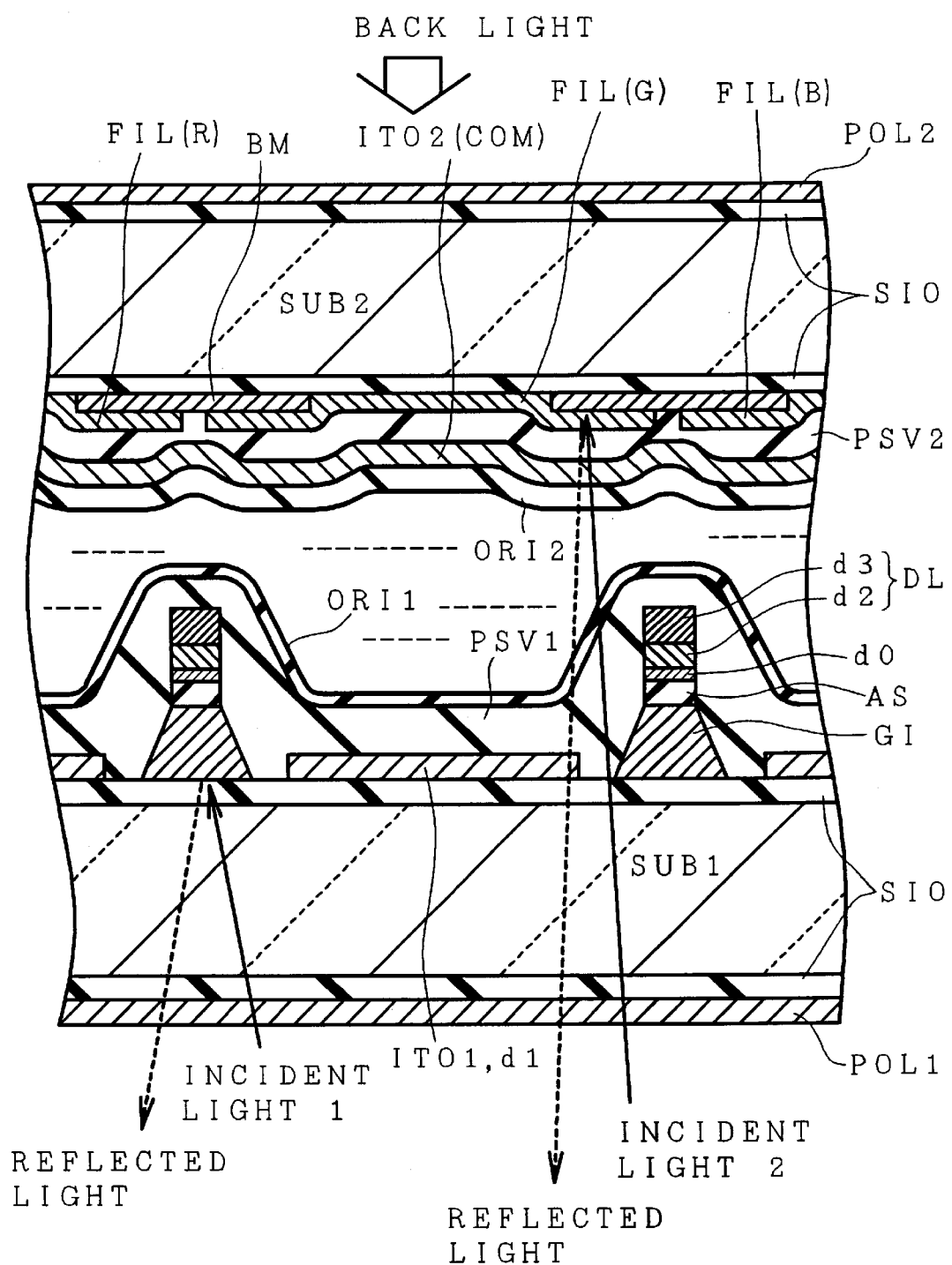
FIG. 10 is a cross section, similar to FIG. 1, showing adjacent video signal lines and a transparent pixel electrode, as a third embodiment of this invention.

FIG. 10 is a cross section, similar to FIG. 1, showing adjacent video signal lines and a transparent pixel electrode in the third embodiment of this invention.

In addition to the structure of the second embodiment of FIG. 9, this embodiment is also characterized in that, as shown in FIG. 10, a color filter FIL is formed on that part of the second transparent glass substrate SUB2 surface which corresponds perpendicularly to both of the transparent glass substrate SUB1, SUB2 surfaces and which is disposed between the i-type semiconductor layer AS and the transparent pixel electrode ITO1. With this arrangement, light entering from between the i-type semiconductor layer AS and the transparent pixel electrode ITO1, e.g., external incident light 2, is adsorbed by the color filter FIL and thus prevented from being reflected by the black matrix BM made of such a metal as chromium, as indicated by the broken line. Therefore, the problem that external light coming from the display surface side is reflected toward the outside (toward the user) by the video signal lines DL and the black matrices BM-which in turn makes the display look like a mirror and renders the image hard to recognize, lowering the contrast and degrading the display quality-can be prevented.

EMBODIMENT 4
(Prevention of Black Matrix BM Reflection)

Figure 11:
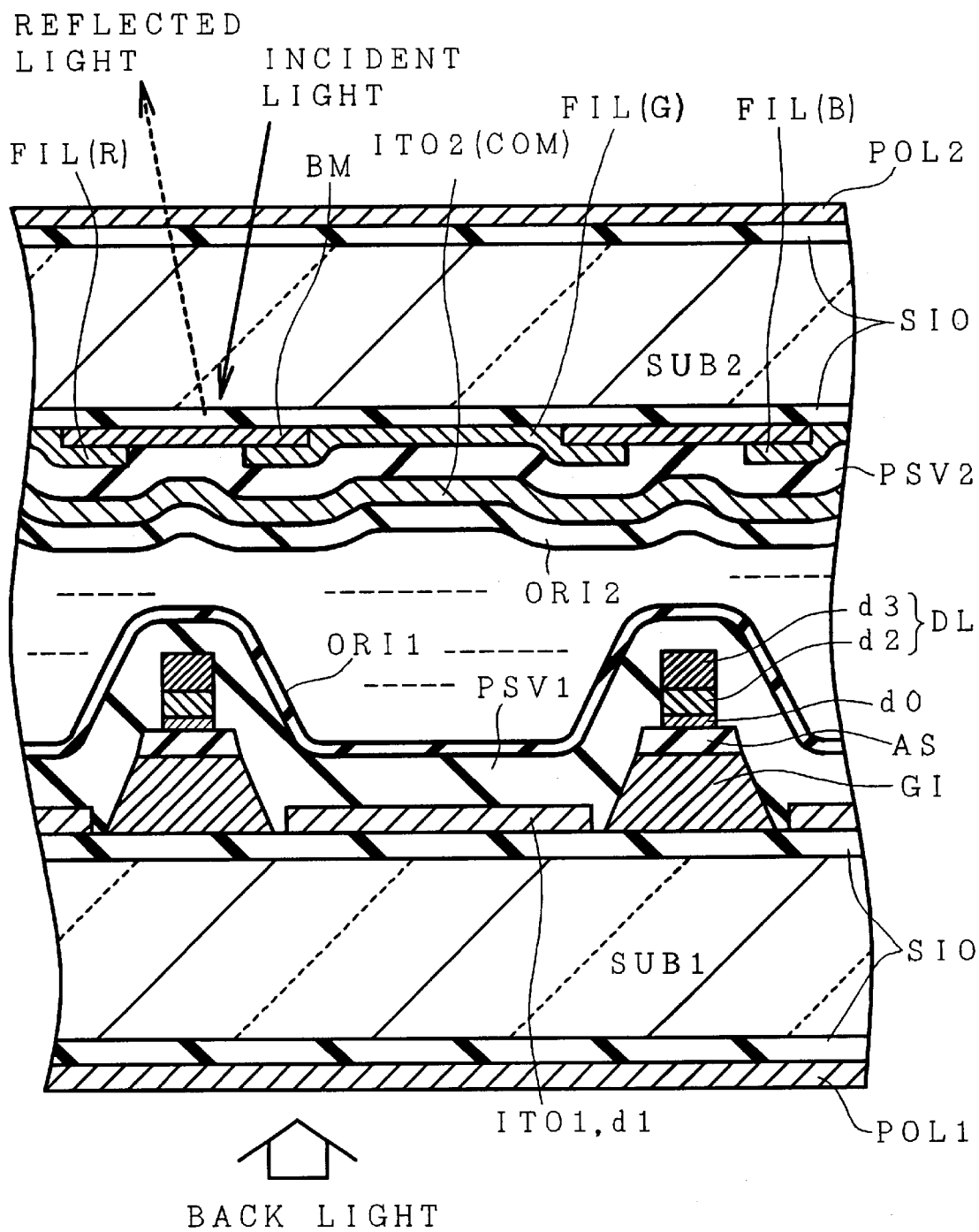
FIG. 11 is a cross section, similar to FIG. 1, showing adjacent video signal lines and a transparent pixel electrode, as a fourth embodiment of this invention.

FIG. 11 is a cross section, similar to FIG. 1, showing adjacent video signal lines and a transparent pixel electrode in the fourth embodiment of this invention.

This embodiment is characterized in that the black matrix BM is formed of the i-type semiconductor layer AS of amorphous silicon and that the backlight is disposed on the first transparent glass substrate SUB1 side. That is, in the perspective view of the liquid crystal display module MDL shown in FIG. 5, the top-bottom relation between the first transparent glass substrate SUB1 and the second transparent glass substrate SUB2 is inverted so that the second transparent glass substrate SUB2 is on the user side (display screen side or observer side). Other structural aspects of this embodiment are similar to those of the first embodiment of FIG. 1. This embodiment also can prevent the problem that external incident light from the display screen side is reflected by the black matrix BM toward the outside, making the screen difficult to see (making the display look like a mirror), lowering the contrast and degrading the display quality.

EMBODIMENT 5
(Prevention of Scan Signal Line GL Reflection)

FIG. 12 is a cross section, similar to FIG. 3, showing a thin-film transistor TFT and its periphery for one pixel as the fifth embodiment of this invention.

This embodiment is characterized in that, as shown in FIG. 12, an antireflection film BM2 made from a dark brown chromium oxide film with low reflectivity is formed between the scan signal lines GL formed of a first conductive film g1 of aluminum including a gate electrode and the first transparent glass substrate SUB1. Other structural features are similar to those of the first embodiment of FIG. 1. Because in the anti-stagger structure the i-type semiconductor layer AS cannot be formed beneath the scan signal line GL containing the gate electrode in the same process as the thin-film transistor TFT channel forming i-type semiconductor layer AS, the antireflection film BM2 formed of chromium oxide film is provided. The antireflection film BM2 has the same pattern shape as the scan signal line GL. This construction eliminates the problem that external incident light from the display screen side is reflected toward the outside (toward the user) by the scan signal line GL, making the display screen difficult to see (making it look like a mirror), lowering the contrast and degrading the display quality.

The present invention has been described in detail in conjunction with examplary embodiments. It is noted, however, that the invention is not limited to these embodiments, but that various modifications may be made without departing from the spirit of this invention. For example, it is possible to make appropriate combinations from among the embodiment 1 of FIG. 1, embodiment 2 of FIG. 9, embodiment 3 of FIG. 10, embodiment 4 of FIG. 11 and embodiment 5 of FIG. 12.

Advantages of the Invention

As described above, this invention can prevent external incident light entering from the display screen side from being reflected toward the outside (toward the user side) by the signal lines and black matrices, thereby improving the image quality.

What is claimed is:

1. A liquid crystal display device having a liquid crystal display panel comprising:
    a first insulating substrate having:
        a plurality of scan signal lines extending horizontally and arranged in a vertical direction;
        a plurality of video signal lines extending vertically and arranged in a horizontal direction; and
        a plurality of sets of a first pixel electrode and a switching element, each set disposed in each intersection area enclosed by two adjacent scan signal lines and two adjacent video signal lines; and
    a second insulating substrate having:
        opposing pixel electrodes disposed facing the first pixel electrodes, the first and second insulating substrates being stacked together with a predetermined gap therebetween and with a liquid crystal sealed between the first and second insulating substrates;
    wherein a backlight is arranged on the second insulating substrate side, a semiconductor film is patterned along and between the video signal lines and the first insulating substrate, the width of the semiconductor film is greater than the width of the video signal lines, for substantially preventing incident light from outside of the display device from being reflected to the outside by the video signal lines so as to improve image quality.

2. A liquid crystal display device according to claim 1, wherein an insulating film is patterned along the video signal lines between the semiconductor film and the first insulating substrate.

3. A liquid crystal display device according to claim 2, wherein the width of the insulating film is greater than the width of the video signal lines.

4. A liquid crystal display device according to claim 2, wherein there is a relationship that the width of the insulating film $\geq$ the width of the semiconductor film > the width of the video signal lines.

5. A liquid crystal display device having a liquid crystal display panel comprising:
    a first insulating substrate having:
        a plurality of scan signal lines extending horizontally and arranged in a vertical direction;

a plurality of video signal lines extending vertically and arranged in a horizontal direction; and a plurality of sets of a first pixel electrode and a switching element, each set disposed in each intersection area enclosed by two adjacent scan signal lines and two adjacent video signal lines; and a second insulating substrate having:

opposing pixel electrodes disposed facing the first pixel electrodes, the first and second insulating substrates being stacked together with a predetermined gap therebetween and with a liquid crystal sealed between the first and second insulating substrates;

wherein a backlight is arranged on the second insulating substrate side, a semiconductor film is patterned along and between the video signal lines and the first insulating substrate, an insulating film is patterned along and between the semiconductor film and the first insulating substrate, and the width of the semiconductor film is greater than the width of the video signal lines, the semiconductor film and the insulating film being arranged for substantially preventing incident light from outside of the display device from being reflected to the outside by the video signal lines so as to improve image quality.

6. A liquid crystal display device according to claim 5, wherein the width of the insulating film is greater than the width of the video signal lines.

7. A liquid crystal display device according to claim 5, wherein there is a relationship that the width of the insulating film $\geq$ the width of the semiconductor film > the width of the video signal lines.

* * * * *